(12) United States Patent
Stegelmann et al.

(10) Patent No.: US 8,827,500 B2
(45) Date of Patent: Sep. 9, 2014

(54) APPARATUS FOR INTERRUPTING A LIGHT BEAM, IN PARTICULAR A LASER LIGHT BEAM

(75) Inventors: Jochen Stegelmann, Scharbeutz (DE); Torsten Grunwald, Malente Ortsteil Sieversdorf (DE); Wolfgang Blunck, Susel (DE); Manfred Rufer, Bosau (DE)

(73) Assignee: Kendrion Kuhnke Automation GmbH, Malente (DE)

( * ) Notice: Subject to any disclaimer, the term of this patent is extended or adjusted under 35 U.S.C. 154(b) by 205 days.

(21) Appl. No.: 13/493,525

(22) Filed: Jun. 11, 2012

(65) Prior Publication Data

US 2013/0229811 A1  Sep. 5, 2013

(30) Foreign Application Priority Data

Mar. 2, 2012 (DE) .......................... 10 2012 203 310

(51) Int. Cl.
| | | |
|---|---|---|
| *F21V 17/02* | (2006.01) | |
| *G02B 5/00* | (2006.01) | |
| *G02B 26/02* | (2006.01) | |

(52) U.S. Cl.
CPC .............. *G02B 5/005* (2013.01); *G02B 26/023* (2013.01)
USPC ........... 362/319; 362/320; 362/321; 362/322; 362/323; 362/324

(58) Field of Classification Search
CPC ............ F21W 2131/406; F21V 11/183; F21S 48/1784; G02B 26/023; G02B 5/005
USPC ................................... 362/319–324
See application file for complete search history.

(56) References Cited

U.S. PATENT DOCUMENTS

| | | | | | |
|---|---|---|---|---|---|
| 3,110,824 | A | * | 11/1963 | Flanagan ...................... | 362/324 |
| 4,778,254 | A | * | 10/1988 | Gilliland et al. .............. | 359/230 |
| 4,946,256 | A | * | 8/1990 | Woodruff ...................... | 359/230 |

FOREIGN PATENT DOCUMENTS

| | | |
|---|---|---|
| DE | 3447316 | 2/1986 |
| DE | 69106089 | 5/1995 |
| EP | 0408657 | 2/1995 |

* cited by examiner

*Primary Examiner* — William Carter
(74) *Attorney, Agent, or Firm* — Rankin, Hill & Clark LLP

(57) ABSTRACT

An apparatus (10) for interrupting a light beam, in particular a laser light beam, with a light beam deflection device (24), wherein the light beam deflection device (24) is arrangeable in the light path of the light beam. An apparatus (10) is characterized in that the light beam deflection device (24) is arranged on a bendable material strip (18), wherein the material strip (18) is held on one side on one end and magnetizable or magnetic sections (20, 22) are arranged on the area facing away from the held end of the material strip (18), preferably on both sides of the material strip (18), wherein a magnet (40, 42) is provided for each section arranged on the material strip (18) and wherein the sections (20, 22) are or can be brought in engagement with the magnetic field of each magnet (40, 42).

11 Claims, 2 Drawing Sheets

APPARATUS FOR INTERRUPTING A LIGHT BEAM, IN PARTICULAR A LASER LIGHT BEAM

BACKGROUND OF THE INVENTION

1. Field of the Invention

The invention relates to an apparatus for interrupting a light beam, in particular a laser light beam, with a light beam deflection device, wherein the light beam deflection device is arrangeable in the light path of the light beam.

2. Description of Related Art

EP 0 408 657 B1 discloses a closure mechanism for interrupting a laser beam targeted from a source along a path. Moreover, DE 34 47 316 C1 describes an apparatus for interrupting a laser beam by a lock arranged in its light path.

BRIEF SUMMARY OF THE INVENTION

Starting from this state of the art, the object of the invention is to provide an interrupting apparatus for a light beam, for example a laser beam, wherein the interrupting apparatus should enable a low-wear positioning of a mirror or the like.

This object is solved by an apparatus for interrupting a light beam, in particular a laser light beam, with a light beam deflection device, wherein the light beam deflection device is arrangeable or respectively insertable or is arranged in the light path of the light beam, which is developed further in that the light beam deflection device is arranged on a bendable material strip, wherein the material strip is held on one side on one end and magnetizable or magnetic sections are arranged on the area facing away from the held end of the material strip, preferably on both sides of the material strip, wherein a magnet is provided for each section arranged on the material strip and wherein the sections are or can be brought in engagement with the magnetic field of each magnet.

The invention is based on the idea that, using two angular sections or tongue-like sections, on a free, i.e. unfixed end of the material strip, the magnetic or magnetizable sections can each be brought in engagement with one magnetic field of a magnet provided for the respective section such that by the changes in the magnetic field on a magnet for a section, the material strip is held on one end, is bent or respectively moved with a light beam deflection device arranged on it and its position is thus variable. A stop-free positioning device or positioning unit for the light beam deflection device provided on the material strip is hereby achieved since the position or respectively the deflection of the free end of the material strip is variable based on the mobility of the bendable or respectively flexible material strip in the case of a change in the magnetic field on one section. Thus, it is possible using magnets to move or deflect the free end of the material strip from an unbent position into a bent position or vice versa, whereby the laser beam deflection apparatus is also moved along or deflected accordingly.

Furthermore, the advantage of the invention consists in that the material strip is arranged in its end positions without mechanical stops during the positioning and deflection of the free end of the material strip and is held stop-free in the end positions in cooperation of the sections with the respective magnetic fields of the magnets, whereby contact with or hitting of the free end in an end position is avoided so that the stop-free positioning takes place without wear. The hitting of the free end of the material strip or the sections provided on the material strips is hereby avoided, whereby the service life of the interruption apparatus according to the invention for a light beam, in particular a laser light beam, is increased.

The sections arranged as extensions on the material strip can be brought in engagement with a magnetic field of one magnet each, wherein depending on the variable strength or the changeable fields of at least one magnetic field the deflection and the positioning of the free end of the material strip are adjustable, thus also for deflection and positioning of the light beam deflection device.

Within the scope of the invention, a light beam is understood to mean electromagnetic waves in the visible spectrum as well as electromagnetic waves outside of the visible spectrum, e.g. the ultraviolet range or infrared range. For example, a laser beam with light beams in the UV range is interrupted by means of the apparatus according to the invention.

Moreover, it is further provided in one embodiment that at least one section or both sections formed on the material strip are formed as angles or angled on the material strip, whereby a compact arrangement of the interruption apparatus is enabled. The magnetizable or magnetic sections are each hereby preferably arranged on one side of the material strip. Within the scope of the invention, it is also conceivable that both sections on one side of the material strip are arranged next to each other and/or behind each other with respect to the longitudinal direction or longitudinal extension of the material strip.

For this, it is further provided in a preferred embodiment of the apparatus that at least one or both sections are formed of a magnetic, in particular soft magnetic, material.

Moreover, it is preferred that at least one or both magnets are each formed for one section as energizeable or powered electromagnets, in particular with a yoke.

In particular, it is preferred that the deflection or positioning of the free end of the material strip and the light beam deflection device is executable or is set depending on the adjustable ratio of the strength of the magnetic fields of the magnets and/or depending on the direction of the magnetic field lines of the magnets.

Furthermore, it is advantageous in one embodiment of the apparatus for interrupting a light beam that at least one or both sections are arranged between the arms of a U-shaped yoke of the respective magnets, in particular of the electromagnets, for the respective section.

Moreover, it is preferred in a further embodiment of the apparatus that the material strip is formed as a leaf spring or as a bending rod or the like. It can hereby be provided in one embodiment that the material strip is made of a non-magnetic or non-magnetizable material or is made of a soft magnetic material so that, for example, the bendable leaf spring is made of a soft magnetic material.

Furthermore, a housing is preferably provided for the apparatus, wherein in particular the material strip and/or the light beam deflection device and/or the sections and/or the magnets are arranged or can be arranged in the housing of the apparatus.

In a special embodiment, it is provided in the case of the apparatus that the magnets, which are preferably formed as electromagnets, have coils, wherein the coils are arranged outside a housing and wherein the poles of the magnets are arranged on the housing such that the respective magnetic field is formed in the housing. In this arrangement, the apparatus has a housing in which the bendable material strip and the light beam deflection device are arranged inside the housing and the coils of the magnets are located outside the housing. In one embodiment, the poles of one or both magnets are thereby also arranged outside the housing, wherein, inside the housing, a respective magnetic field is provided for the material strip to be bent. In an alternative embodiment, the poles of one or both magnets are thereby arranged in the housing and the respective spool outside the housing so that, inside the housing, a respective magnetic field is formed for the material strip to be bent.

For this, it is also provided that the housing has an aperture opening, wherein the light beam deflection device is arranged in the area of the aperture opening. It is thereby achieved that, upon entry of a light beam through the aperture opening for deflecting the light beam, the light beam deflection device is arranged in the housing opposite the aperture opening whereby the light beam is deflected into the inside of the housing. The straight light path is hereby deflected outside the housing after entry of the light into the housing. In order to let a light beam, in particular a laser light beam, through the housing, the light beam deflection device is moved out and away from the entering light beam through deflection of the material strip and the light beam deflection device so that the light beam thus passes unhindered through the housing in the case of a positioning of the light beam deflection device outside the strange light path of the light beam.

Moreover, it is suggested in a further development of the apparatus that the light beam deflection device is formed as a mirror or as a prism and/or that the light beam deflection device is formed as a planar reflection body, in particular mirror, wherein in particular the surface normal of the reflection body is arranged at an angle between 0° to 90°, in particular between 30° to 60°, and furthermore in particular at an angle of 45°, to the light path of the light of a light source, in particular a laser light source, on the material strip.

Moreover, it is also provided in one embodiment of the apparatus that a mono-stable electromagnet is provided for a section arranged on the material strip and a bi-stable electromagnet is provided for another second section arranged on the material strip, whereby it is possible to bend and to position the material strip with its free end accordingly so that the light beam deflection device is arranged or can be arranged in an opening position for letting a light beam pass, in particular a laser light beam, through the housing in the case of a bent material strip, and is arranged or can be arranged in a position for deflecting the light beam into the housing in the case of an unbent material strip.

Moreover, the apparatus is preferably formed as a laser shutter for a laser light source.

BRIEF DESCRIPTION OF THE DRAWINGS

Further characteristics of the invention will become apparent from the description of the embodiments according to the invention together with the claims and the attached drawing. Embodiments according to the invention can fulfill individual characteristics or a combination of several characteristics. It shows in:

DETAILED DESCRIPTION OF THE INVENTION

Figure 1:
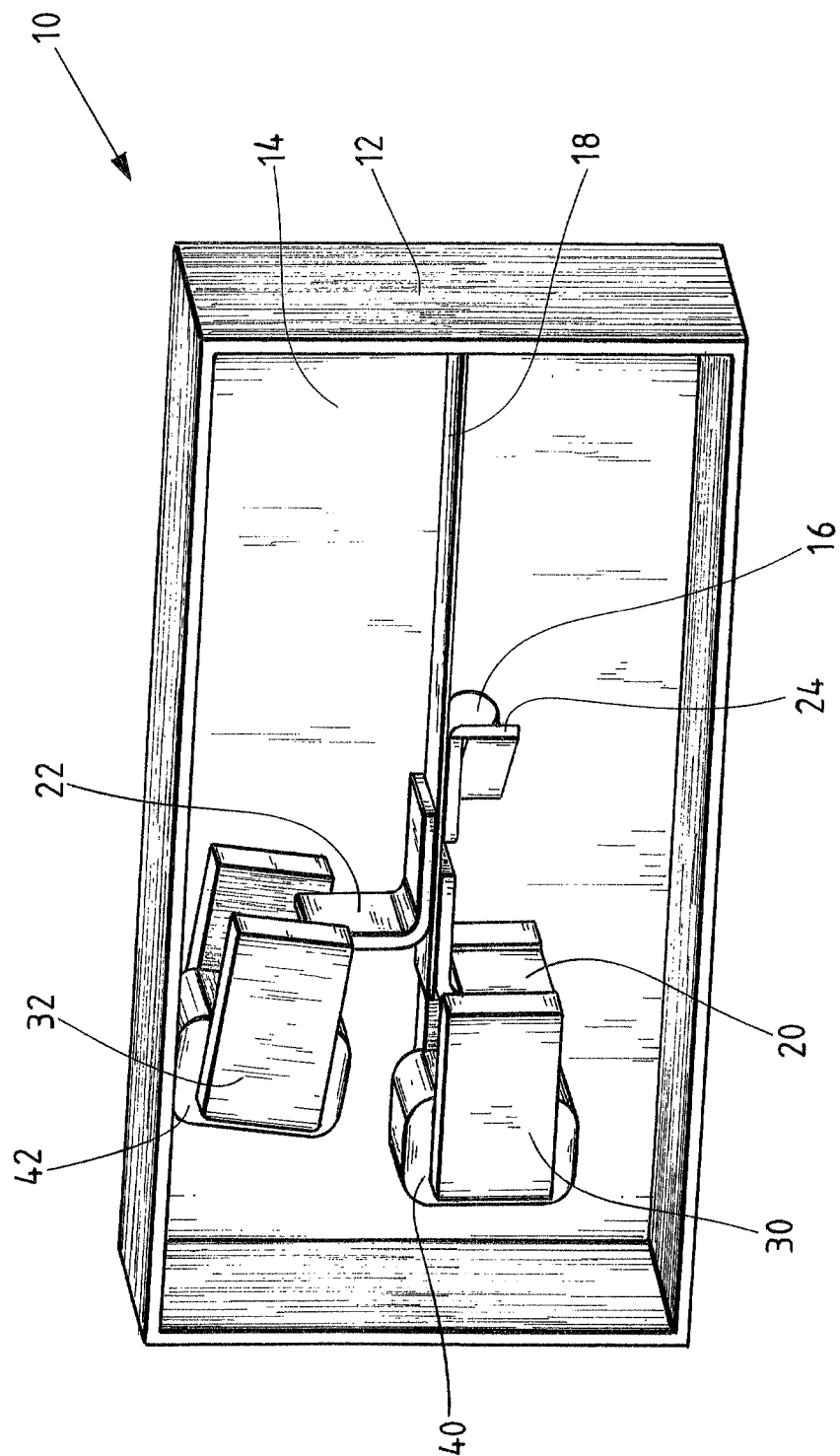
FIG. 1 is a perspective representation of an apparatus for interrupting a laser beam.
Figure 2:
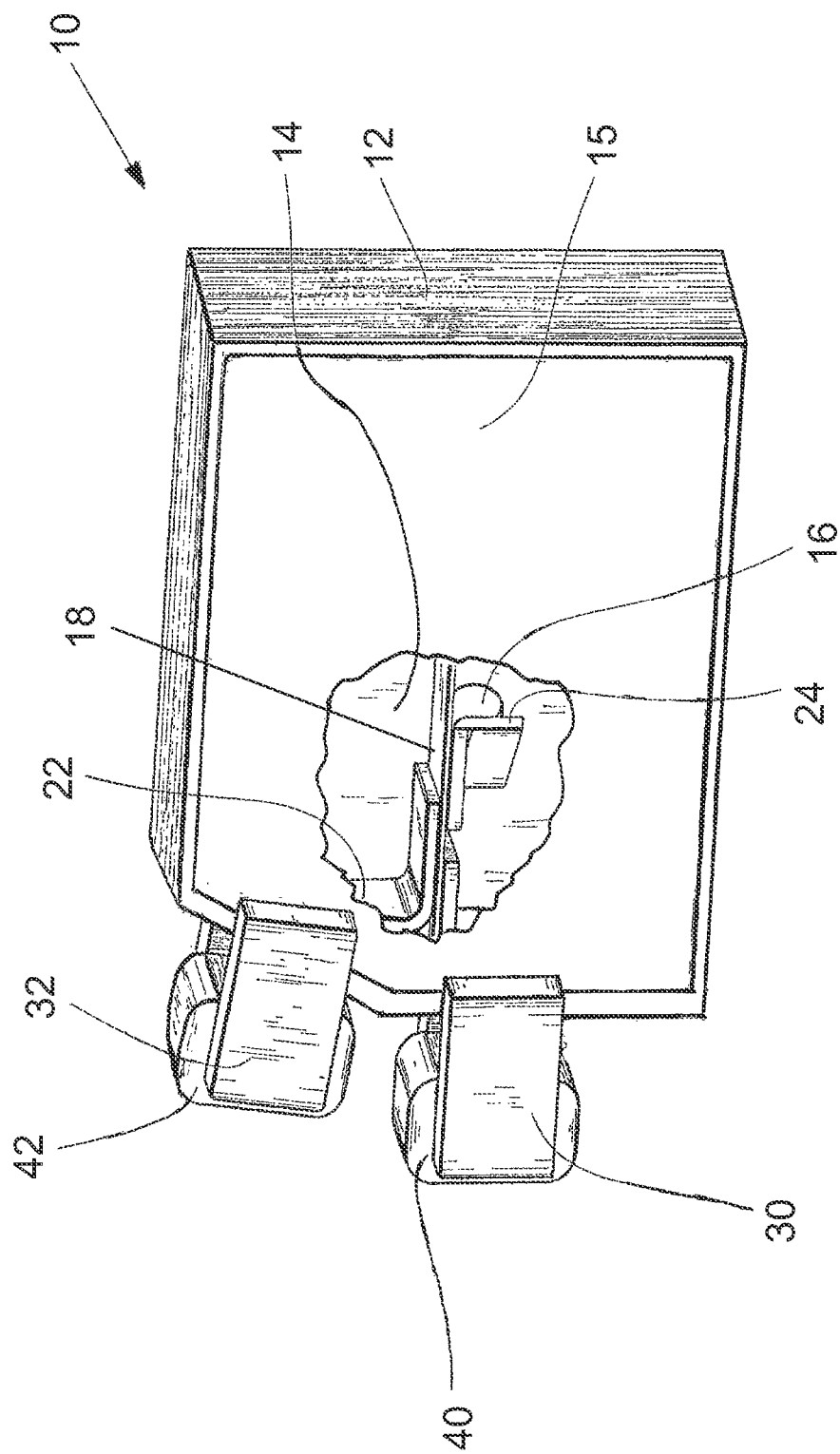
FIG. 2 is a perspective representation of an apparatus for interrupting a laser beam.

FIGS. 1 and 2 show perspective representations of an apparatus 10 for interrupting a laser beam. The apparatus 10 has a closed housing 12. With regard to FIG. 1, the front side is shown open with omission of one front wall for reasons of better illustration. With regard to FIG. 2, the front wall 15 is illustrated to include a cut-away so that the arrangement of the parts within the housing 12 can be viewed for explanation purposes. The housing 12 has a back wall 14, wherein the back wall 14 is formed with an aperture opening 16 in order to let a laser beam enter the housing 12 through the aperture opening 16. In the case of the passage of a laser beam through the housing 12, the front wall (not shown here) also has a corresponding aperture opening.

A leaf spring 18 is arranged inside the housing 12, wherein the leaf spring 18 is held fixed on one side on one end. The leaf spring 18 is formed bendable and extends inside the housing 12. Soft magnetic angles 20, 22, which mainly have the small width like the leaf spring 18, are arranged on the free end of the leaf spring 18, i.e. in the area of the leaf spring 18 facing away from the mounted end of the leaf spring 18 on the top side and on the bottom side. Furthermore, a mirror 24 is arranged on the leaf spring 18 between bottom-side angle 20 and the mounted end of the blade spring 18 in the area of the aperture opening 16, wherein the mirror 24 preferably has a planar mirror surface. The mirror surface of the mirror 24 is hereby preferably arranged at an angle of 45°, i.e. diagonally to the light path of the light beam entering the housing 12.

The soft magnetic angles 20, 22 arranged on the free end of the leaf spring 18 are arranged with their projecting free ends respectively between the legs of a yoke 30, 32 respectively of a energizeable electromagnet 40, 42.

Both the yoke 30 of the electromagnet 40 as well as the yoke 32 of the electromagnet 42 are formed U-shaped so that the corresponding angle 20, 22 is arranged or respectively positioned between the legs of the U-shaped yokes 30, 32 in the case of the formation of a strong magnetic field on one of the electromagnets 40, 42 due to the occurring magnetic forces. The angle 22 is hereby pulled upwards during powering of the electromagnet 42, for example upon formation of a strong magnetic field, whereby the leaf spring 18 is bent and thus the mirror 24 is removed from the light path of the laser beam so that the mirror 24 is thereby located in an opening position.

In the case of current feed of the U-shaped yokes 30, 32 arranged above each other, the angles 20, 22 provided on the yokes 30, 32 are pulled in and held positioned alternating in the air gap between the lateral arms of the yokes 30, 32. The angles 20, 22 are hereby moved alternating into the corresponding stop-free end positions between an open position and a closed position of the mirror, wherein no fixed mechanical stop is provided for the angles or respectively for the leaf spring 18. Rather a stop-free positioning of the free end of the leaf spring 18 formed as a material strip is provided through the powering of the electromagnets 40, 42. In particular, an electromagnet 40, 42 is formed as a mono-stable electromagnet and the other electromagnet is formed as a bi-stable electromagnet. As shown in FIG. 1, the magnets 40, 42 are arranged in the housing 12. In FIG. 2, the magnets 40, 42 have coils that are arranged outside the housing 12.

All named characteristics, also those to be taken alone from the drawing as well as individual characteristics, which are disclosed in combination with other characteristics, are considered significant to the invention alone and in combination. Embodiments according to the invention can be fulfilled through individual characteristics or a combination of several characteristics.

| List of Reference Numbers | |
| --- | --- |
| 10 | Apparatus |
| 12 | Housing |
| 14 | Back wall |
| 16 | Aperture opening |
| 20 | Angle |
| 22 | Angle |

-continued

| List of Reference Numbers | |
| --- | --- |
| 24 | Mirror |
| 30 | Yoke |
| 32 | Yoke |
| 40 | Electromagnet |
| 42 | Electromagnet |

The invention claimed is:

1. An apparatus (10) for interrupting a laser light beam, comprising:
a light beam deflection device (24),
wherein the light beam deflection device (24) is arrangeable in the light path of the light beam,
wherein the light beam deflection device (24) is arranged on a bendable material strip (18),
wherein the material strip (18) is held on one side on one end and magnetizable or magnetic sections (20, 22) are arranged on the area facing away from the held end of the material strip (18), on both sides of the material strip (18),
wherein a magnet (40, 42) is provided for each section arranged on the material strip (18),
wherein the sections (20, 22) are or can be brought in engagement with the magnetic field of each magnet (40, 42),
wherein a mono-stable electromagnet is provided for a section (20, 22) arranged on the material strip (18) and a bi-stable electromagnet is provided for the other, second section arranged on the material strip (18).

2. The apparatus (10) according to claim 1, wherein at least one or both sections (20, 22) formed on the material strip (18) are formed as angles or angled on the material strip (18).

3. The apparatus (10) according to claim 1, wherein at least one or both sections (20, 22) are formed of a soft magnetic, material.

4. The apparatus (10) according to claim 1, wherein at least one or both magnets (40, 42) are formed as energizeable electromagnets (40, 42) with a yoke (30, 32).

5. The apparatus (10) according to claim 1, wherein a deflection or a positioning of the free end of the material strip (18) and the light beam deflection device (24) are executable depending on the adjustable ratio of the strength of the magnetic fields of the magnets (40, 42) and/or depending on the direction of the magnetic field lines of the magnets (40, 42).

6. The apparatus (10) according to claim 1, wherein at least one or both sections (20, 22) are arranged between arms of a U-shape yoke (30, 32) of the electromagnets (40, 42) for the respective section (20, 22).

7. The apparatus (10) according to claim 1, wherein the material strip (18) is formed as a leaf spring (18) or as a bending rod.

8. The apparatus (10) according to claim 1, wherein a housing (12) is provided, wherein the material strip (18) and/or the light beam deflection device (24) and/or the sections (20, 22) and/or the magnets (40, 42) are arranged in the housing (12).

9. The apparatus (10) according to claim 8, wherein the housing (12) has an aperture opening (16), and wherein the light beam deflection device (24) is arranged in an area of the aperture opening (16).

10. The apparatus (10) according to claim 1, wherein the magnets (40, 42) have coils, wherein the coils are arranged outside a housing (12) and wherein poles of the magnets are arranged on the housing such that a respective magnetic field is formed in the housing.

11. The apparatus (10) according to claim 1, wherein the light beam deflection device (24) is formed as a mirror (24) or as a prism and/or that the light beam deflection device (24) is formed as a planar reflection body, wherein the surface normal of the reflection body is arranged at an angle between 0° to 90°, to the light path of the light of a laser light source, on the material strip (18).

\* \* \* \* \*